(12) United States Patent
Baldal

(10) Patent No.: US 7,437,883 B1
(45) Date of Patent: Oct. 21, 2008

(54) BODY ARMOR COOLING SYSTEM

(75) Inventor: Ronald Baldal, Paso Robles, CA (US)

(73) Assignee: CoolCop, LLC, Paso Robles, CA (US)

( * ) Notice: Subject to any disclaimer, the term of this patent is extended or adjusted under 35 U.S.C. 154(b) by 259 days.

(21) Appl. No.: 11/239,580

(22) Filed: Sep. 28, 2005

Related U.S. Application Data

(60) Provisional application No. 60/613,642, filed on Sep. 28, 2004.

(51) Int. Cl.
F25D 23/12 (2006.01)

(52) U.S. Cl. ........................................ 62/259.3; 62/404

(58) Field of Classification Search ................ 62/259.1, 62/244, 259.3, 314, 404, 419; 165/41, 42, 165/46, 80.1; 454/127, 903, 121, 143, 144, 454/152, 155, 156, 306; 2/462, 463
See application file for complete search history.

(56) References Cited

U.S. PATENT DOCUMENTS

| | | | | |
|---|---|---|---|---|
| 3,383,778 A | * | 5/1968 | Goodman | 34/90 |
| 3,468,299 A | * | 9/1969 | Amato | 126/204 |
| 4,055,173 A | * | 10/1977 | Knab | 128/847 |
| 4,964,282 A | * | 10/1990 | Wagner | 62/259.3 |
| 5,062,424 A | * | 11/1991 | Hooker | 128/897 |
| 5,197,294 A | * | 3/1993 | Galvan et al. | 62/3.62 |
| 5,823,869 A | * | 10/1998 | Paturzo | 454/152 |
| 5,921,467 A | * | 7/1999 | Larson | 237/12.3 C |
| 6,131,645 A | * | 10/2000 | Barr | 165/41 |
| 6,178,562 B1 | * | 1/2001 | Elkins | 2/458 |
| 6,843,717 B1 | * | 1/2005 | Bennett | 454/152 |
| 6,874,332 B2 | * | 4/2005 | Forgach | 62/259.3 |
| 6,884,159 B1 | * | 4/2005 | Ferraud, Jr. | 454/119 |
| 6,902,473 B1 | | 6/2005 | Goobeck | |
| 6,993,930 B2 | * | 2/2006 | Blackstone | 62/421 |

FOREIGN PATENT DOCUMENTS

JP 2004-218458 A * 8/2004

* cited by examiner

Primary Examiner—Mohammad M Ali
(74) Attorney, Agent, or Firm—Deborah A. Peacock; Philip D. Askenazy; Peacock Myers, P.C.

(57) ABSTRACT

A body armor cooling system for law enforcement officers having a hook-shaped nozzle attached to one end of a flexible hose member and a bellows assembly attached to the other end of the flexible hose member. The end of the hook-shaped nozzle is tucked beneath the protective armor that the law enforcement officer is wearing in order to provide a cooling effect. The bellows assembly is connected to the air conditioner vent opening on the dash of the vehicle. The bellows assembly makes an air tight seal with the dash of the vehicle and it can be easily attached and detached.

7 Claims, 3 Drawing Sheets

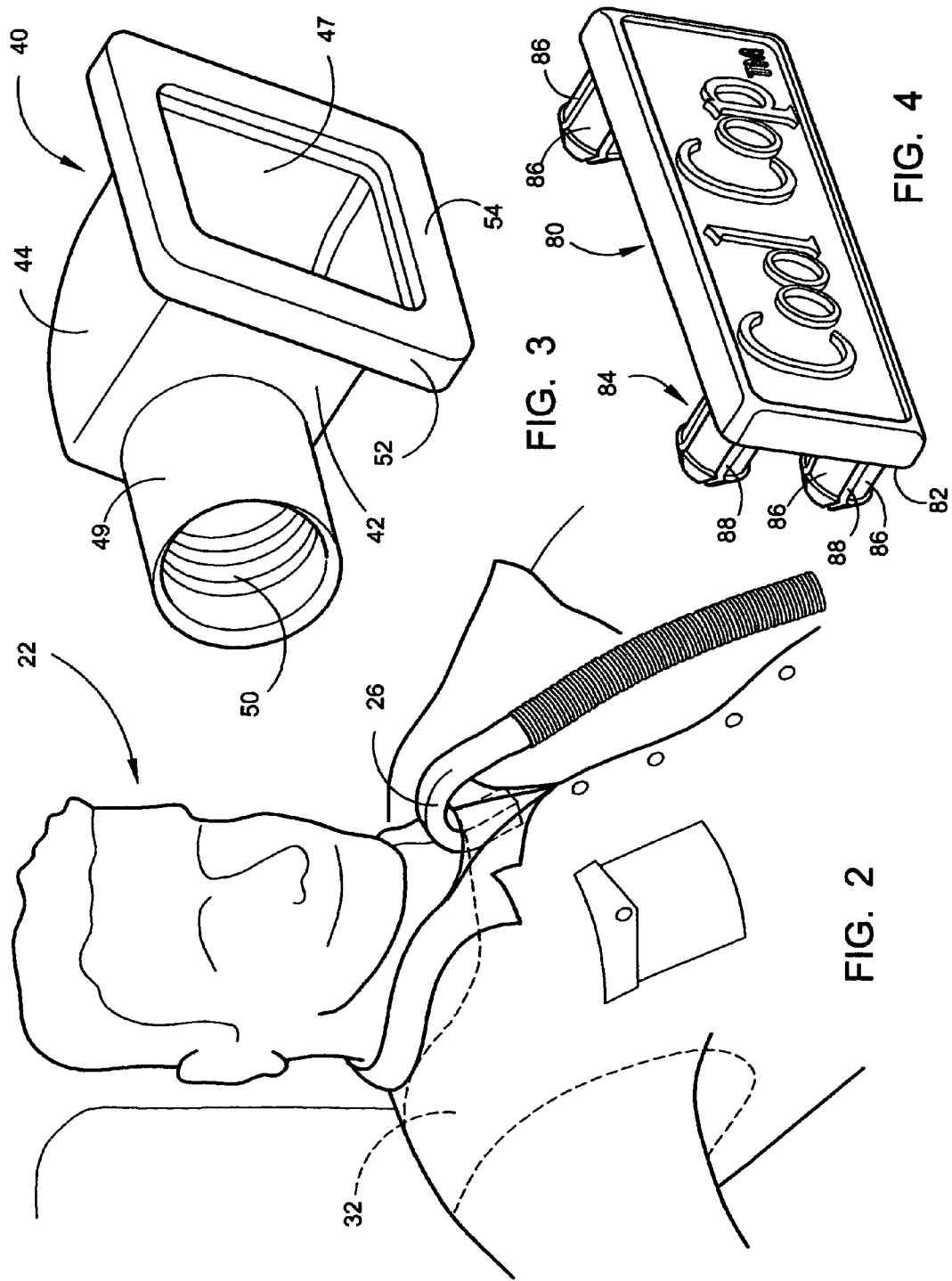

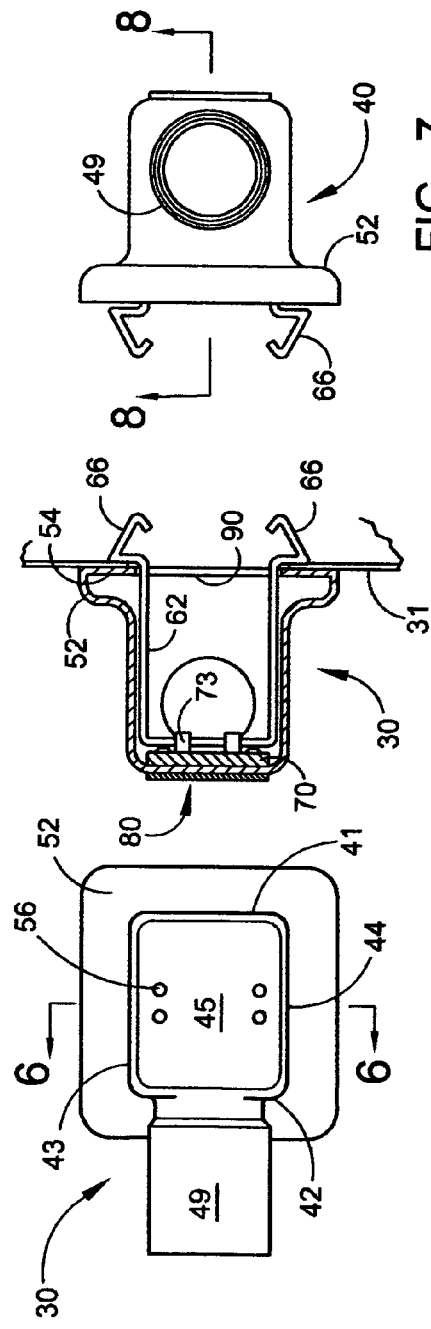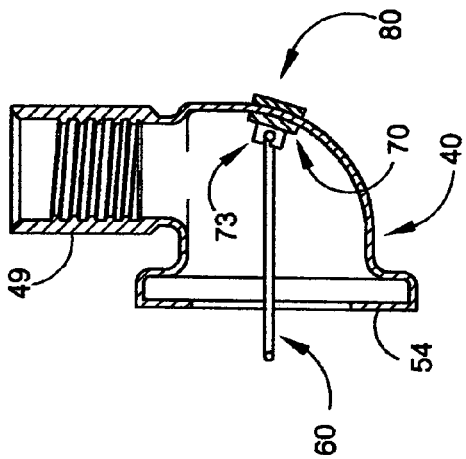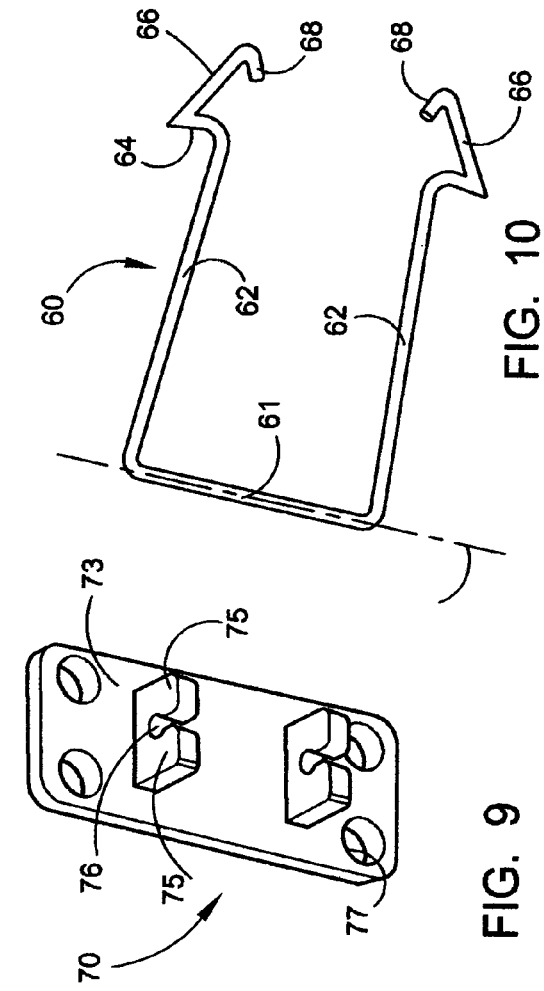

BODY ARMOR COOLING SYSTEM

Applicant hereby claims priority of U.S. Provisional Patent Application Ser. No. 60/613,642 filed Sep. 28, 2004.

BACKGROUND OF THE INVENTION

The invention relates to the cooling of an individual and more particularly to a law enforcement officer when he is in his vehicle and wearing body armor. When law enforcement officers working in warm climates or climates having high humidity, quite often they become hot and sweaty while riding in their vehicles. When a protective armor vest must be worn, the law enforcement officer is even more uncomfortable. In these situations, no amount of air conditioning coming out of the vehicle air vents can keep the officer cool and dry.

It is an object of the invention to provide a novel body armor cooling system that can be used by law enforcement officers to keep them from becoming overheated in their vehicle while wearing protective armor.

It is also an object of the invention to provide a novel body armor cooling system having a bellows assembly that provides a complete seal of the air conditioning vent when it is attached thereto.

It is another object of the invention to provide a novel body armor cooling system that is easily installed in the vehicle of a law enforcement officer.

It is an additional object of the invention to provide a novel body armor cooling system that can have the nozzle quickly and easily removed from the area of the law enforcement officer's chest.

It is also an object of the invention to provide a novel body armor cooling system that is economical to manufacture and market.

SUMMARY OF THE INVENTION

The body armor cooling system has three major components. They are the hook-shaped nozzle that is inserted on one end of a flexible hollow hose and the bellows assembly that is installed on the other end of the flexible hollow hose. The principal part of the bellows assembly is a soft plastic bellows member having a hollow interior chamber. A tubular neck portion is in communication with the hollow interior chamber and it also provides structure for attachment to one end of the flexible hollow hose member. The bellows member also has a bottom opening that would be in communication with and surround an air conditioner ventilation vent on the dash of the vehicle. The bellows member has a closed loop inwardly extending flange member on its bottom and that would be pressed against the surface of the dash just surrounding the ventilation opening. The U-shaped spring clip is mounted in the interior of the bellows member and it has leg members that can be compressed inwardly toward each other in order to insert the cam surface leg portions of the spring clip into the ventilation opening. After they passed through the opening, the cam surface leg members expand outwardly and the shoulder leg portion of the leg members press upwardly against the interior surface of the dash and seals the closed loop inwardly extending flange member of the bellows member against the outer surface f the dash.

The structure for supporting the U-shaped spring clip inside the bellows member is a spring clip rt plate having a pair of laterally spaced mounting clips that would engage the cross member portion of the U-shaped spring clip. The spring clip support plate has apertures at its four corners that would receive the snap pins extending downwardly from a backing plate. The four snap pins are inserted through apertures in the top wall of the bellows member and then into the apertures in the spring clip support plate where they would expand and be rigidly secured. The bellows member would be made of a plastic or rubber material that is flexible enough so that the left and right side walls thereof can be squeezed inwardly to compress the leg members of the spring clip together for removal of the bellows member assembly from the dash.

DESCRIPTION OF THE DRAWINGS

FIG. 2 is an elongated front perspective view illustrating the hook-shaped nozzle of the body armor cooling system inserted beneath the law enforcement officer's protector armor;

FIG. 3 is an enlarged bottom perspective view of the bellows member;

FIG. 4 is an enlarged top perspective view of the backing plate;

FIG. 5 is a top plan view of the bellows member with the backing plate removed;

FIG. 6 is a vertical cross section taken along lines 6-6 of FIG. 5;

FIG. 7 is a rear elevation view of the bellows member assembly;

FIG. 8 is a cross sectional view taken along lines 8-8 of FIG. 7;

FIG. 9 is a bottom perspective view of the spring clip support plate; and

FIG. 10 is a top plan view of the U-shaped spring clip.

DESCRIPTION OF THE PREFERRED EMBODIMENT

Figure 1:
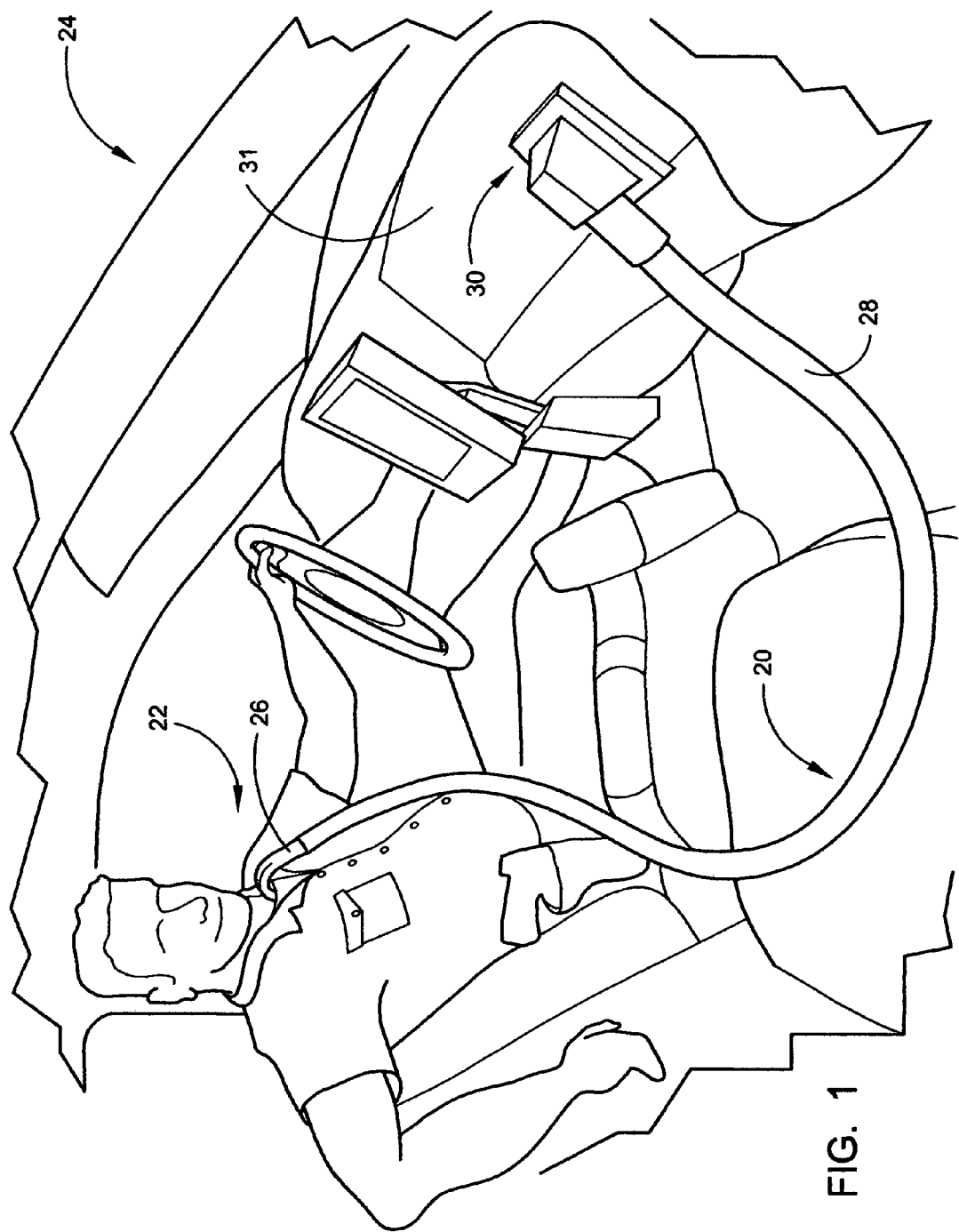
FIG. 1 is a front perspective view illustrating a law enforcement officer in a vehicle and being hooked-up to the body armor cooling system.

The body armor cooling system will now be described by referring to FIGS. 1-10 of the drawings. The body armor cooling system is generally designated numeral 20. In FIG. 1 a law enforcement officer 22 is depicted seated in a vehicle 24 having a dash 31. The major components of the body armor cooling system 20 are hook-shaped nozzle 26, flexible hollow hose member 28 and bellows assembly 30.

FIG. 2 is a close-up perspective view of the law enforcement officer 22 showing that the outlet end of hook-shaped nozzle 26 has been inserted beneath the protective armor 32 that the officer is wearing. Protective armor 32 is normally a bullet proof vest.

Bellows assembly 30 will now be described by referring to FIGS. 3-10. The most prominent part of the assembly is bellows member 40 that normally be made of a soft plastic material. It has a front wall 41, a rear wall 42, a left side wall 43, a right side wall 44 and a top wall 45. Bellows member 40 has a hollow interior chamber 47 and it has an open bottom end. A tubular neck portion 49 having internal threads 50 extends from rear wall 42. A closed loop shoulder portion 52 extends outwardly from the bottom ends of the respective side walls of bellows 40. A closed loop inwardly extending flange member 54 is formed on the bottom end of closed loop shoulder portion 52. Top wall 45 has four apertures 56 whose purpose will be described later.

The U-shaped spring clip 60 is best illustrated in FIGS. 6-10. It has a cross member 61 having a longitudinally extending X-axis. A pair of laterally spaced leg members 62 extend downwardly from the opposite ends of cross member 61. The bottom ends of the respective leg member 62 have a shoulder leg portion 64 extending outwardly away from each other. A cam surface leg 66 extends downwardly and inwardly from the respective shoulder leg portions 64. Each cam surface leg 66 has an upwardly extending toe portion 68 adjacent its bottom end.

Spring clip support plate 70 is illustrated in FIG. 9. It has a bottom surface 71. A pair of mounting clips 73 extend downwardly from bottom surface 71. Each mounting clip 73 has a pair of laterally spaced fingers 75 with an opening 76 formed therebetween. Fingers 75 are resilient enough to allow the cross member 61 to be pressed inwardly between them after which the fingers snap back together. A plurality of apertures 77 are located at the corners of spring clip support plate 70.

Backing plate 80 is illustrated in FIG. 4. It has a top surface 81 and a bottom surface 82. A plurality of snap pins 84 are integrally formed with backing plate 80 and they extend downwardly therefrom. Each snap pin then has four leg members 86 with slots 88 between them. Each leg member 86 has a beveled front end surface that allows them to be pressed into the respective apertures 77 and they snap outwardly when fully inserted in the apertures. The cross sections shown in FIGS. 6 and 8 show the assembled interior structure. FIG. 6 shows the ventilation opening 90 in dash 31. When installing bellows member assembly 30 over ventilation opening 90, the cam surface leg portions 66 of U-shaped spring clip 60 are compressed inwardly until they pass through the opening 90 in the dash. After that they spring backward and form an airtight seal between the closed inwardly extending flange member 54 and the outer surface of dash 31. If there is a wish to remove the bellows assembly member from the dash, it is merely necessary to press inwardly on the flexible side walls of bellows member 40 that is made of soft plastic material. This will cause the leg member 62 to be compressed inwardly toward each other thereby allowing the cam surface leg portions 66 to be withdrawn from the ventilation opening 90.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended Claims.

What is claimed is:

1. A body armor cooling system comprising:
an elongated flexible hollow hose member having a front end, a predetermined length to at least extend across the width of a motor vehicle and a rear end;
a nozzle connected to said rear end of said flexible hollow hose member directing cool air at a person seated in a vehicle;
air collection means connected to said front end of said flexible hollow hose member receiving cool air out of an air vent in the dash of a vehicle, said air collection means being a housing having an air inlet port, a hollow interior chamber and an air outlet port, said housing having a front wall, a rear wall, a left side wall, a right side wall, a top wall having a top surface and a bottom surface, and an open bottom end that functions as said air inlet port;
a closed loop shoulder portion formed adjacent said bottom end of said housing for mating with the dash of a vehicle;
said closed loop shoulder portion being of sufficient dimensions so that it would entirely surround an air vent in said dash; and
a U-shaped spring clip forming a seal between a closed inwardly extending flange member and the outer surface of the dash and means for supporting said U-shaped spring clip from the bottom surface of said top wall of said housing.

2. A body armor cooling system as recited in claim 1 wherein said rear wall has a tubular neck portion extending rearwardly therefrom and said tubular neck portion functions as said air outlet port.

3. A body armor cooling system as recited in claim 1 wherein said closed loop shoulder portion has a rectangular configuration.

4. A body armor cooling system as recited in claim 1 wherein said closed loop shoulder portion has a bottom edge around its entire perimeter and a closed loop inwardly extending flange member is connected to said bottom edge of said closed loop shoulder portion.

5. A body armor cooling system as recited in claim 2 wherein said nozzle is hook-shaped.

6. A body armor cooling system as recited in claim 1 wherein said housing is detachably connected to the dash of a vehicle.

7. A body armor cooling system as recited in claim 1 wherein said side walls of said housing are made of flexible material so that they can be squeezed inwardly to compress said U-shaped spring clip so that it can be disengaged from an air vent in the dash of a vehicle.

\* \* \* \* \*